April 2, 1929.  E. O. ESTWING  1,707,787
HANDLE
Filed July 29, 1926
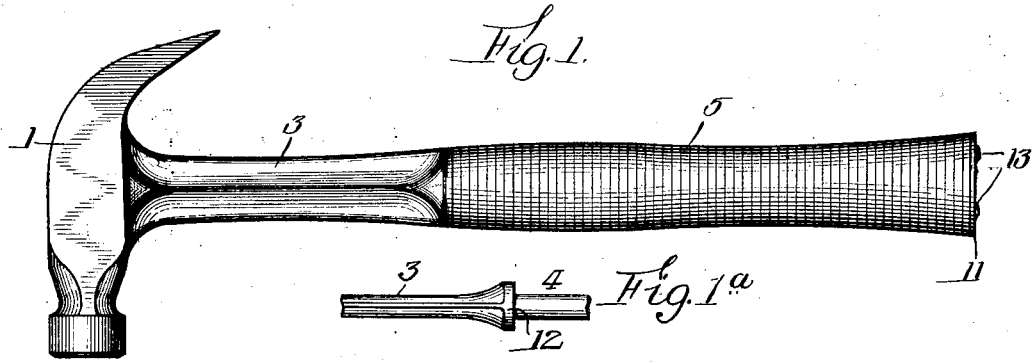
Fig. 1.
Fig. 1a.
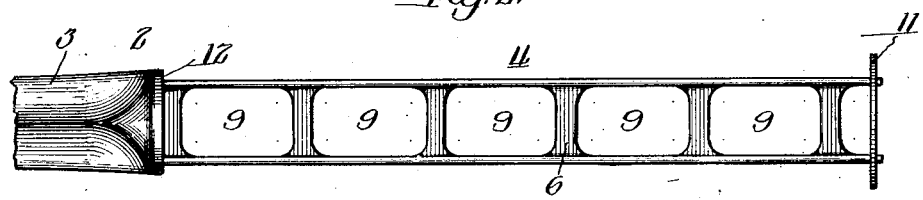
Fig. 2.
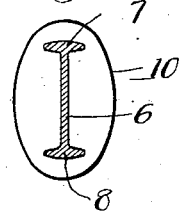
Fig. 3.
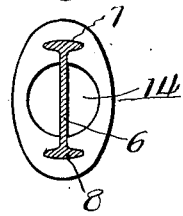
Fig. 4.
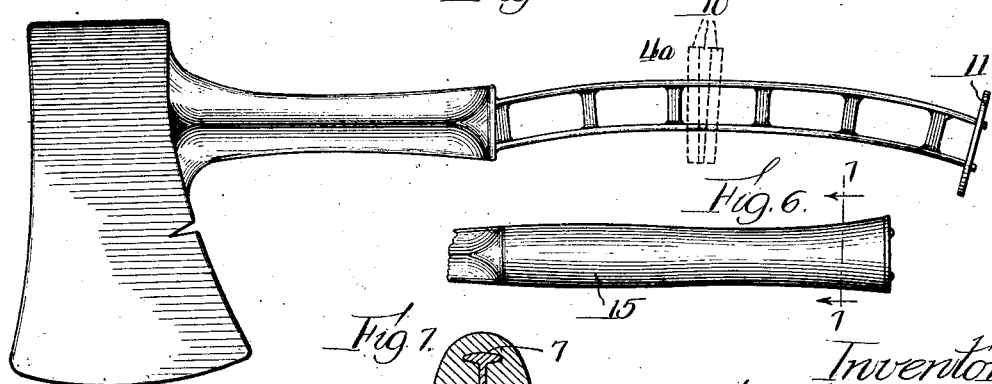
Fig. 5.
Fig. 6.
Fig. 7.
Inventor
E. O. Estwing, Patented Apr. 2, 1929.

1,707,787

UNITED STATES PATENT OFFICE.

ERNEST O. ESTWING, OF ROCKFORD, ILLINOIS, ASSIGNOR TO ESTWING MANUFACTURING COMPANY, INC., OF ROCKFORD, ILLINOIS, A CORPORATION OF ILLINOIS.

HANDLE.

Application filed July 29, 1926. Serial No. 125,603.

This invention has special utility in connection with hand striking tools of the character shown in my Patent No. 1,578,502, dated March 30, 1926. Said patent discloses axes, hammers and hatchets in which the head and the handle are drop-forged in one piece, the handle being so shaped and heat-treated that maximum strength is obtained with minimum weight, and the tool is properly balanced.

The present invention relates particularly to the construction of the handle of such a tool, although certain features of the invention are not limited to tools of the one-piece drop-forged type. Heretofore the ideal handle has been assumed to be one possessing a considerable degree of flexibility. I have found, however, that if the tool is properly balanced and the handle made as light as possible, the handle should preferably be rigid.

Among the objects of the invention are to make the handle as light as possible while obtaining a high degree of rigidity, and to provide a grip which shall feel comfortable in the hand and be as light as practicable.

In the accompanying drawings:

Figure 1 is a side elevation of a claw hammer provided with a handle embodying the features of my invention.

Fig. 1ª is a fragmental top plan view of the handle shank, on the same scale as Fig. 1.

Fig. 2 is a fragmental view of the handle prior to application of the grip.

Fig. 3 is a cross-sectional view of the handle.

Fig. 4 is a cross-sectional view showing an alternative form of grip.

Fig. 5 is a view of a hatchet having a handle embodying the features of this invention, the grip being omitted.

Fig. 6 is a side view of a grip formed of molded material.

Fig. 7 is a section on line 7—7 of Fig. 6.

For a detailed description of the manner in which the head and handle shank are formed, reference may be made to the above-mentioned Patent No. 1,578,502. It is sufficient here to say that the claw hammer head 1 and the handle shank 2 are drop-forged in one piece. In the embodiment shown in the present drawings, the handle shank comprises a forward portion or neck 3 and a rear or grip-carrying portion 4 on which the grip 5 is mounted. As shown in Figs. 1 and 1ª, the neck 3 is relatively thin, its mean thickness being less than one-third of its width in the plane of the head. The thinness of the neck 3 is highly desirable for the sake of lightness and to avoid interference when working in close quarters. In order that the handle portion 4 shall be both rigid and light, said handle portion is preferably I-form in cross-section, as shown in Fig. 3. It comprises a vertical web 6 and narrow transverse top and bottom flanges 7 and 8. The flanges 7 and 8 resist alternately the compressive and tensile stresses which are set up when blows are struck with the head of the tool, the web 6 serving as the equivalent of truss members. To further lighten the handle, openings 9 may be formed in the web 6, as shown in Fig. 2.

The grip shown in Figs. 1, 3, 4, and 5 is formed of transversely laminated leather or analogous material. The laminations or washers 10 have internal openings conforming to the cross-sectional shape of the handle portion 4, as shown in Fig. 3. After a sufficient number of leather washers 10 have been forced upon the handle portion 4, the washers are secured in place by means of a steel end cap 11 having openings therein conforming to the cross sectional shape of the extreme rear end of the handle shank. At the junction of the neck 3 and the grip-carrying portion 4 is an annular shoulder 12. The washers 10 are compressed between the annular shoulder 12 on the handle shank and the end cap 11 by riveting the ends of the handle portion which project through said cap, as shown at 13 in Fig. 1. The grip may then be given its proper external form and coated with any preferred finishing material.

If desired, the weight of the grip may be still further reduced by forming an internal opening 14 in each washer, as shown in Fig. 4.

The interengagement between the handle portion 4 and the grip 5 is such that stresses in every direction are effectively resisted. When pressure is applied to the grip from the top, as when pulling a nail with a claw hammer, the grip has a firm bearing against the top of the flange 7 and the top or inner surfaces of the flange 8. If pressure be applied to the grip in the opposite direction, the grip has a bearing against the bottom of the flange 8 and the lower or inner surfaces of the flange 7. If pressure be applied from either side, as when using a hatchet in pulling a nail or prying up a board, the grip bears against the side of the web 6 and against the sloping inner surfaces of the flanges 7 and 8, so that even though the grip be hollow for the sake of lightness it will nevertheless be firmly interlocked with the flanges 7 and 8 and the web 6 and well supported against distortion.

When the laminated-leather grip is to be applied to hatchets and to axes of the scout-axe type, the grip-carrying portion of the shank may be of any suitable cross-section, the I-form cross-section not being essential. However, in Fig. 5 I have shown the grip as applied to a handle portion 4ª of the last-mentioned form. If desirable, the handle may be curved, as indicated in Fig. 5. The grip shown in Fig. 5 may be made up of washers such as those illustrated in Figs. 3 and 4, a sufficient number of the washers being tapered, as shown by dotted lines in Fig. 5.

If desired, the grip may be formed of bakelite or the like molded on the handle portion 4. Such a grip is indicated by the numeral 15 in Figs. 6 and 7.

A grip formed in the manner shown in Figs. 1 and 6 has various advantages over a grip made up of wooden scales riveted to the shank. The grip herein disclosed has a smooth, continuous, unbroken surface, whereas in a grip formed of wooden scales there are joints between the wood and the metal which even though smooth and tight at first may eventually become uneven and uncomfortable to the hand.

The handle construction herein shown is so light that, if desired, most of the weight of the complete tool may be concentrated in the head. In the case of each of the tools shown in the drawings, the weight of the complete handle is less than that of the head, thus giving the tool the balance required for efficient and comfortable use over a relatively long period without fatigue.

For the sake of brevity, the term "leather" has been used in the following claim to denote leather or any analogous material.

I claim as my invention:

A hand striking tool having a head and a handle, said handle comprising a thin and wide, light but rigid steel neck and a light rigid grip-carrying portion of thin webbed flanged or I-form cross-section integral with the neck, there being a shoulder at the junction of the neck and the grip-carrying portion, a grip completely surrounding the grip-carrying portion and comprising a series of leather washers having internal openings conforming to the flanges on the longitudinal edges of the grip-carrying portion, whereby the washers are interlocked with and held immovably upon the grip-carrying portion, and a metallic end cap fitting on the rear end of the grip-carrying portion and serving to confine the series of washers against the shoulder, the end of the grip-carrying portion being riveted to hold the end cap in place.

In testimony whereof, I have hereunto affixed my signature.

ERNEST O. ESTWING.